United States Patent
Roper et al.

(10) Patent No.: US 9,042,827 B2
(45) Date of Patent: May 26, 2015

(54) MODIFYING A FUNCTION BASED ON USER PROXIMITY

(71) Applicant: LENOVO (Singapore) PTE, LTD., New Tech Park (SG)

(72) Inventors: Matthew Price Roper, Raleigh, NC (US); Robert A. Bowser, Cary, NC (US); Scott Edwards Kelso, Cary, NC (US); Howard Locker, Cary, NC (US); John Weldon Nicholson, Cary, NC (US)

(73) Assignee: Lenovo (Singapore) PTE. LTD., Tech Park (SG)

( * ) Notice: Subject to any disclaimer, the term of this patent is extended or adjusted under 35 U.S.C. 154(b) by 163 days.

(21) Appl. No.: 13/680,945

(22) Filed: Nov. 19, 2012

(65) Prior Publication Data

US 2014/0141759 A1 May 22, 2014

(51) Int. Cl.
*H04B 7/00* (2006.01)
*H04W 4/02* (2009.01)

(52) U.S. Cl.
CPC ..................................... *H04W 4/023* (2013.01)

(58) Field of Classification Search
CPC ....... H04W 4/023; H04W 4/021; H04W 4/20; H04W 4/206
USPC .............. 455/410, 414.1, 456.3, 3.01–3.06, 455/418–421, 41.1–41.3
See application file for complete search history.

(56) References Cited

U.S. PATENT DOCUMENTS

| | | | |
|---|---|---|---|
| 7,463,890 B2* | 12/2008 | Herz et al. ..................... | 455/445 |
| 7,620,363 B2* | 11/2009 | Spurgat et al. ............... | 455/3.05 |
| 8,391,773 B2* | 3/2013 | Arseneau et al. ............ | 455/3.06 |
| 2001/0037367 A1* | 11/2001 | Iyer ............................... | 709/204 |
| 2002/0115454 A1* | 8/2002 | Hardacker .................... | 455/457 |
| 2006/0206582 A1* | 9/2006 | Finn ............................. | 709/217 |
| 2007/0129004 A1* | 6/2007 | Goldberg et al. ............ | 455/3.06 |
| 2008/0261514 A1* | 10/2008 | Pratt et al. .................... | 455/3.06 |
| 2011/0281532 A1* | 11/2011 | Shin et al. ....................... | 455/77 |
| 2012/0270576 A1* | 10/2012 | Herrington et al. .......... | 455/466 |
| 2013/0217332 A1* | 8/2013 | Altman et al. .............. | 455/41.2 |
| 2013/0217333 A1* | 8/2013 | Sprigg et al. ................. | 455/41.2 |
| 2013/0331127 A1* | 12/2013 | Sabatelli et al. ............ | 455/456.3 |
| 2014/0057566 A1* | 2/2014 | Watfa et al. ................. | 455/41.2 |

* cited by examiner

*Primary Examiner* — Sharad Rampuria
(74) *Attorney, Agent, or Firm* — Kunzler Law Group (57) ABSTRACT

For modifying a function based on user proximity, a proximity module determines a distance between an electronic device and a transported device in wireless communication with the electronic device. The proximity module further modifies a function of the electronic device if the distance is within the specified range.

20 Claims, 4 Drawing Sheets

MODIFYING A FUNCTION BASED ON USER PROXIMITY

BACKGROUND

1. Field

The subject matter disclosed herein relates to modifying a function and more particularly relates to modify a function based on user proximity.

2. Description of the Related Art

Electronic devices may have functions that could continually be employed. However, it may be useful to modify some of those functions to reduce cost.

BRIEF SUMMARY

Based on the foregoing discussion, the inventors have recognized a need for an apparatus, method, and program product that modify a function based on user proximity. An apparatus for modified a function based on user proximity is disclosed. The apparatus includes a computer readable storage medium and a proximity module. The computer readable storage medium stores machine readable code executed by a processor. The proximity module determines a distance between an electronic device and a transported device in wireless communication with the electronic device. The proximity module further modifies a function of the electronic device if the distance is within the specified range. The method and program product also perform the functions of the apparatus.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

Descriptions of Figures may refer to elements described in previous Figures, like numbers referring to like elements.

Figure 1:
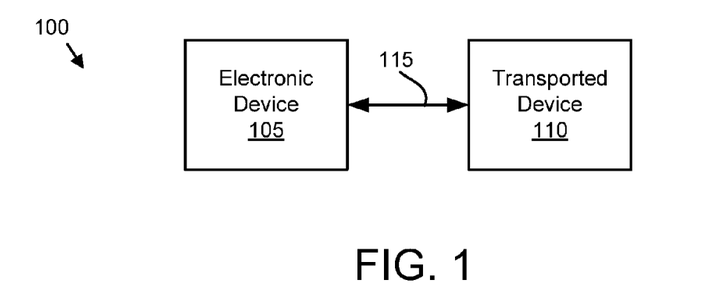
FIG. 1 is a schematic block diagram illustrating one embodiment of a function modification system.

FIG. 1 is a schematic block diagram illustrating one embodiment of a function modification system 100. The system 100 includes an electronic device 105 and a transported device 110. The transported device 110 may be in wireless communication 115 with the electronic device 105. The wireless communication may be through a wireless connection such as a Bluetooth connection as defined by the Bluetooth Special Interest Group.

The wireless connection may also employ a WiFi network based on any one of the Institute of Electrical and Electronics Engineers (IEEE) 802.11 standards. In addition the wireless connection may employ Radio Frequency Identification (RFID) communication including RFID standards established by the International Organization for Standardization (ISO), the International Electrotechnical Commission (IEC), the American Society for Testing and Materials (ASTM), the DASH7 Alliance, and EPCGlobal.

Alternatively, the wireless connection may employ a ZigBee connection based on the IEEE 802 standard. In one embodiment, the wireless connection employs a Z-Wave connection as designed by Sigma Designs. Alternatively, the wireless connection may employ an ANT and/or ANT+ connection as defined by Dynastream Innovations Inc. of Cochrane, Canada.

The wireless connection may be an infrared connection including connections conforming at least to the Infrared Physical Layer Specification (IrPHY) as defined by the Infrared Data Association (IrDA). Alternatively, the wireless connection may be a cellular telephone network communication. All standards and/or connection types include the latest version and revision of the standard and/or connection type as of the filing date of this application.

The electronic device 105 may support one or more functions. The functions may include a wireless data stream such as over a cellular telephone network. The functions may also include a real-time quote system, a music service, a news service, and the like.

Some of the functions may have an incremental cost to the user. In addition, some of the functions may have a system bandwidth and/or an environmental impact. The embodiments described herein determine a distance between the electronic device 105 and the transported device 110. The embodiments further modify a function of the electronic device 105 if that distance is within a specified range. By modifying the function based on range, the function may only be activated when a user within an appropriate distance to make use of the function. Thus the expense, bandwidth use, and environmental impact of using the function may be reduced as will be described hereafter.

Figure 2:
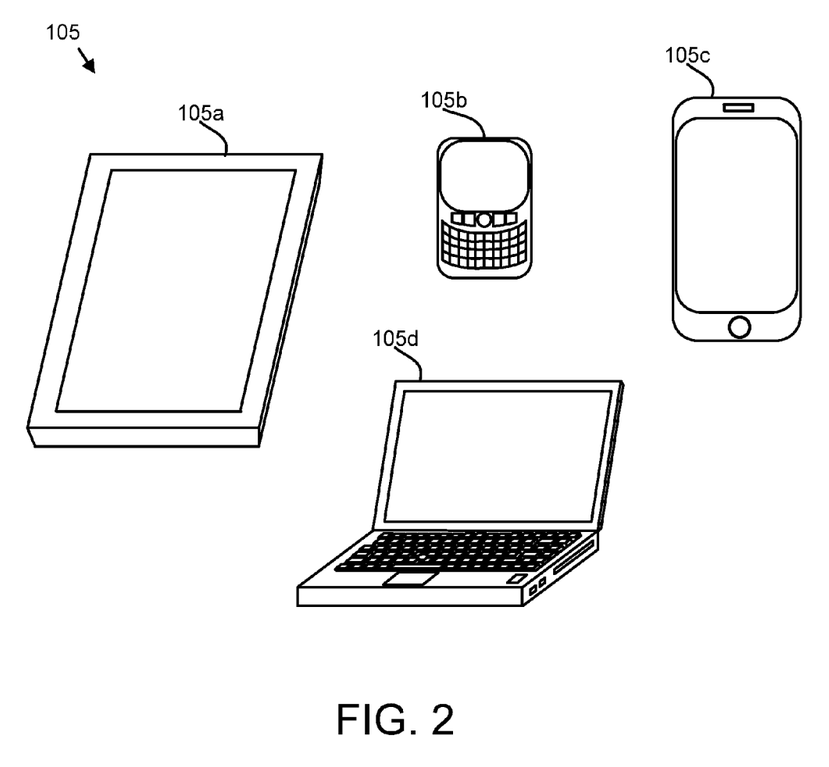
FIG. 2 is drawings of embodiments of electronic devices.

FIG. 2 shows drawings of embodiments of electronic devices 105. The electronic devices 105 include but are not limited to a tablet computer 105a, a mobile telephone 105b, a smart phone 105c, and a laptop computer 105d. Other embodiments of electronic devices 105 may include a personal digital assistant, an electronic wallet, a portable music player, a portable video player, an ignition and/or activation system of a vehicle, and the like.

Figure 3:
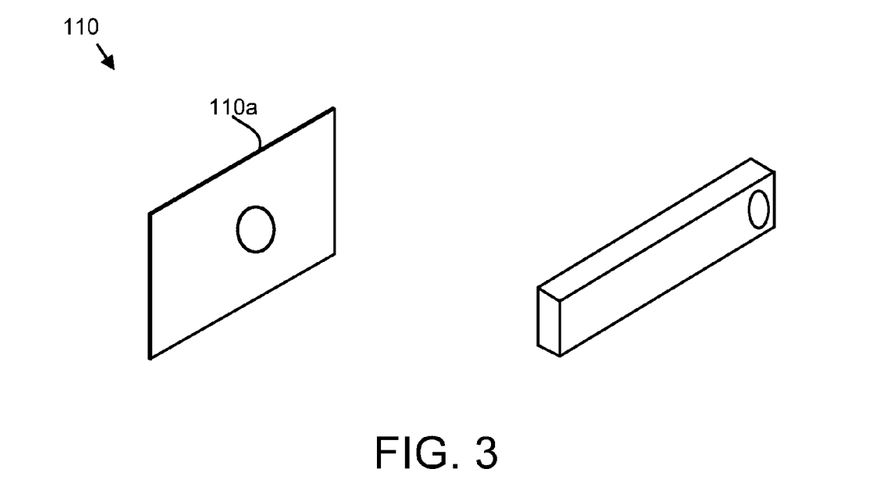
FIG. 3 is drawings of embodiments of transported devices.

FIG. 3 is drawings of embodiments of transported devices 110. The transported devices 110 include but are not limited to a smart card 110a and a fob 110. The transported devices 110 may also include but are not limited to an RFID chip, an infrared reflector, a mobile telephone, and the like.

In one embodiment, the transported device 110 includes electronic circuit for wireless communication with the electronic device 105. The transported device 110 may be in continuous wireless communication with the electronic device 105. Alternatively, the transported device 110 may communicate with the electronic device 105 after a specified time interval. In a certain embodiment, the transported device 110 responds to a wireless communication from the electronic device 105.

In one embodiment, the transported device 110 is carried on the person of the user. For example, the transported device 110 may be carried in a pocket, purse, wallet, bag, or briefcase. The transported device 110 may also be attached to a keychain, embedded in clothing, or embedded in a personal article such as a key. In a certain embodiment, the transported device 110 is a software/hardware function of another electronic device 105. For example, a smart phone electronic device 105c may serve as the transported device 110 for a laptop computer electronic device 105d.

Figure 4:
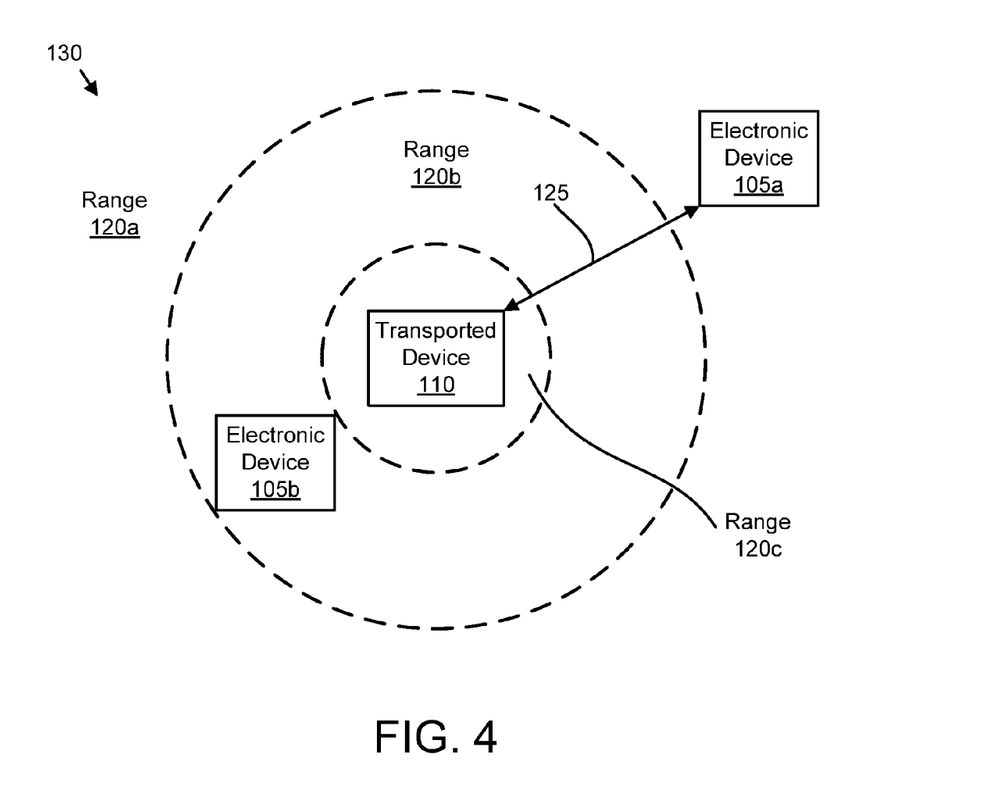
FIG. 4 is a schematic block diagram illustrating one embodiment of ranges between electronic devices and a transported device.

FIG. 4 is a schematic block diagram illustrating one embodiment of ranges 120 between electronic devices 105 and the transported device 110. As depicted, one or more electronic devices 105 may be in wireless communication with the transported device 110. Alternatively, a single electronic device 105 may be in communication with the transported device 110.

Ranges 120 of distance between the transported device 110 and the electronic devices 105 are depicted. The ranges 120 may be specified by a manufacturer of the electronic device 105. Alternatively, the ranges 120 may be specified by the user. For example, the user may select range options for each electronic device 105. In one embodiment, the user may set the range options through an options menu.

In the depicted embodiment, a near range 120c, a medium range 120b, and a far range 120a are shown. One of skill in the art will recognize that the embodiments may be practiced with other gradations of ranges 120. In one embodiment, an outer boundary of the near range 120c is 0-5 meters. An outer boundary of the medium range 120b may be 10-20 meters while an inner boundary of the medium range 120b may be the outer boundary of the near range 120c. An outer boundary of the far range 120a may be infinity while an inner boundary of the far range 120a may be the outer boundary of the medium range 120b.

A distance 125 between an electronic device 105 and the transported device 110 may be calculated using a Received Signal Strength Indicator (RSSI). The RSSI may estimate the distance 125 based on signal strength. Equation 1 may be used to calculate the distance d 125, where k is a constant and s is the signal strength.

$$d = k * \sqrt[3]{s} \qquad \text{Equation 1}$$

Alternatively, the distance 125 may be calculated from a return signal. For example, the electronic device 105 may communicate a signal to the transported device 110. The transported device 110 may communicate the return signal to the electronic device 105 in response to the signal. The electronic device 105 may calculate the distance 125 from the time interval between the signal and the return signal.

In an alternate embodiment, the distance 125 between the electronic device 105 and the transported device 110 is calculated from the loss of wireless communication between the electronic device 105 and the transported device 110. For example, if a Bluetooth connection between the electronic device 105 and the transported device 110 is lost, the distance 125 may be estimated at greater than 10 meters.

In one embodiment, the distance 125 is calculated from a wireless communication fingerprint. The wireless communication fingerprint may comprise the identities and the signal strengths of one or more wireless networks monitored by the electronic device 105 and the transported device 110. Both the transported device 110 and the electronic device 105 may each estimate a position based on the wireless communication fingerprint. Alternatively, the transported device 110 may record the wireless communication fingerprint and communicate the wireless communication fingerprint to the electronic device 105, and the electronic device 105 may calculate the position of the transported device 110. The electronic device 105 may calculate the distance 125 from the positions of the transported device 110 and the electronic device 105.

In one embodiment, the distance 125 is calculated from a radio direction finding. The transported device 110 and the electronic device 105 may each measure a change in angle to a radio source. The transported device 110 may communicate the change in angle to the electronic device 105 and the electronic device 105 may calculate the distance 125.

Alternatively, the transported device 110 and the electronic device 105 may each measure a direction to the radio source relative to an absolute direction. The electronic device 105 may estimate the distance 125 based on the angle of the transported device 110 to the radio source and the angle of the electronic device 105 to the radio source.

In one embodiment, the transported device 110 and the electronic device 105 may each calculate an inertial navigation location. In one embodiment, the navigation location of the transported device 110 and the electronic device 105 may be set to a common origin when the transported device 110 and the electronic device 105 are in a common location. The common location may be determined by signal strength. The transported device 110 may subsequently estimate an inertial navigation location and communicate the inertial navigation location of the transported device 110 to the electronic device 105. The electronic device 105 may also calculate an inertial navigation location and calculate the distance 125 between the two inertial navigation locations.

In one embodiment, the transported device 110 and the electronic device 105 each include a global positioning system (GPS) that determines a location. The transported device 110 may communicate a GPS location to the electronic device 105 and the electronic device 105 may calculate the distance 125.

Figure 5:
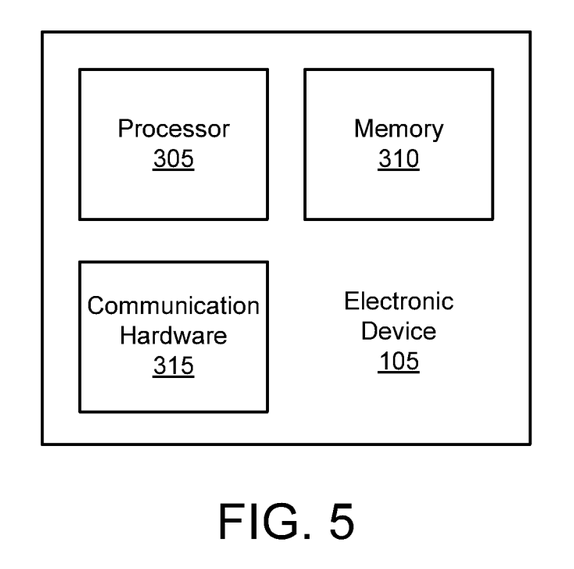
FIG. 5 is a schematic block diagram illustrating one embodiment of an electronic device 105.

FIG. 5 is a schematic block diagram illustrating one embodiment of an electronic device 105. The electronic device 105 may include a processor 305, a memory 310, and communication hardware 315. The memory 310 may be a computer readable storage medium such as a semiconductor storage device, a hard disk drive, a holographic storage device, a micromechanical storage device, or the like. The memory 310 may store machine readable code. The processor 305 may execute the machine readable code. The communication hardware 315 may communicate with other devices.

Figure 6:
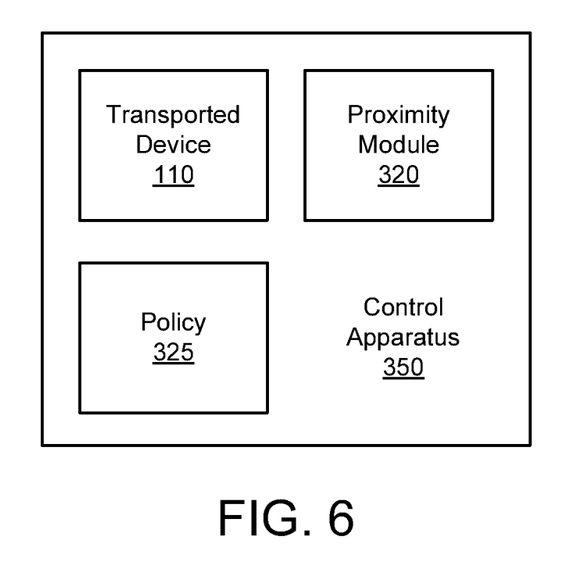
FIG. 6 is a schematic block diagram illustrating one embodiment of a control apparatus 350.

FIG. 6 is a schematic block diagram illustrating one embodiment of a control apparatus 350. A portion of the control apparatus 350 may be embodied in the electronic device 105. In one embodiment, the control apparatus 350 includes a proximity module 320. In addition, the control apparatus 350 may include the transported device 110 and a policy 325.

The transported device 110 is the transported device 110 of FIGS. 1, 3, and 4. The proximity module 320 and the policy 325 may be embodied in a computer readable storage medium such as the memory 310 storing machine readable code. The processor 305 may execute the machine readable code to perform the functions of the proximity module 320 and the policy 325.

The proximity module 320 may determine a distance 125 between the electronic device 105 and the transported device 110. The proximity module 320 may further modify a function of the electronic device 105 if the distance 125 is within a specified range 120.

The policy 325 may specify modifications for one or more functions at one or more specified ranges 120. In one embodiment, the policy 325 lists a plurality of functions and modifications to each function for one or more ranges 125.

In one embodiment, the modification decreases a service rate for the function. For example, the modification may decrease the service rate for receiving a wireless data stream. Alternatively, the modification may increase the service rate for the function. For example, the modification may increase the service rate for receiving the wireless data stream by the electronic device 105.

In one embodiment, the modification locks the electronic device 105. For example, the modification may prevent accessing a user interface of the electronic device 105. Alternatively, the modification may prevent the activation of the electronic device 105.

In an alternate embodiment, the modification unlocks the electronic device 105. For example, the modification may allow access to the user interface of the electronic device 105. In addition, the modification may allow the activation of the electronic device 105.

In one embodiment, the modification changes a status of the electronic device 105. For example, the modification may change a status of the electronic device 105 from "online" to "away." Alternatively, the modification may change the status of the electronic device 105 from "inactive" to "active."

In one embodiment, modifying the function disables the function. For example, the function may be the wireless data stream. Modifying the function may disable the wireless data stream. Alternatively, modifying the function may enable the function. For example, modifying the function may enable the wireless data stream.

Table 1 illustrates a prophetic example of functions, ranges, and modifications. One of skill in the art will recognize that embodiments may be practiced with other combinations of functions, ranges, and modifications.

TABLE 1

| Function | Near Range | Medium Range | Far Range |
| --- | --- | --- | --- |
| Wireless Data | Full service rate | reduced service rate | no service |
| Notification | modify to vibrate | modified to ring | modify to silent |
| Video | full video download and display | reduced video download, reduced video quality, and pause display | video download from free data stream only |
| Music | full music download and broadcast | pause music download and continue broadcast using stored music | pause music download and pause broadcast |

In one embodiment, the function is not modified during a critical operation. The critical operation may be a backup operation, a system update, a download of a movie, a synchronization operation, or the like. For example, the policy 325 may maintain a full wireless data service for backing up the electronic device 105 even if the distance between the transported device 110 and the electronic device 105 is in the far range 120a.

Figure 7:
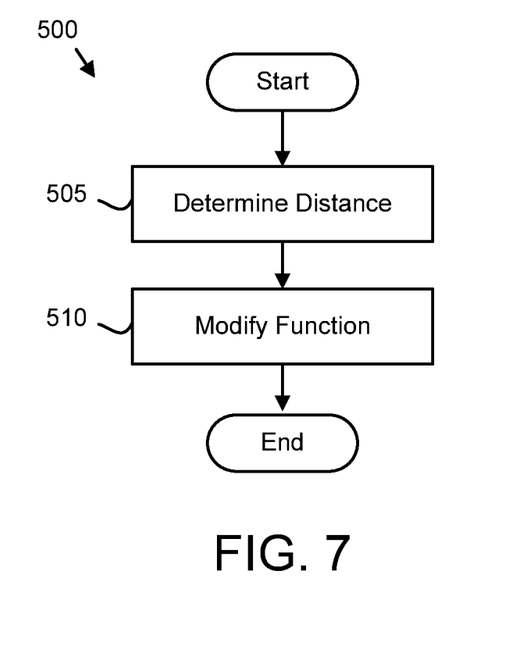
FIG. 7 is a schematic flow chart diagram illustrating one embodiment of a function modification method.

FIG. 7 is a schematic flow chart diagram illustrating one embodiment of a function modification method 500. The method 500 may be performed by the system 100 and apparatus 350. In one embodiment, the method 500 is performed by a program product comprising a computer readable storage medium such as the memory 310 storing machine readable code. The machine readable code may be executed by the processor 305 to perform the operations of the method 500.

The method 500 starts, and in one embodiment the proximity module 320 determines 505 the distance 125 from the electronic device 105 to the transported device 110. The electronic device 105 may be in wireless communication 115 with the transported device 110. The electronic device 105 may communicate a signal such as a specified packet to the transported device 110. The transported device 110 may decode the signal. The transported device 110 may further communicate a return signal such as an alternate specified packet to the electronic device 105 after a specified delay interval has elapsed. The proximity module 320 may record a time when the return signal is received.

The proximity module 320 may calculate the distance a 125 using Equation 2, where TI is a total elapsed interval from communicating the signal to receiving the return signal, DI is the delay interval, and c is the speed of electromagnetic radiation.

$$d=(TI-DI)/c \quad \text{Equation 2}$$

The proximity module 320 may further determine a range 120 corresponding to the distance 125. In one embodiment, the proximity module 320 employs a lookup table to determine the range 120. In alternate embodiment, the range 120 is a real number. For example, the range 120 may be calculated using Equation 3, where r is the range 125, m is a constant, and d is the distance 125.

$$r=md^2 \quad \text{Equation 3}$$

The proximity module 320 may modify 510 one or more functions of the electronic device 105 if the distance 125 is within a specified range 120 and the method 500 ends. In one embodiment, the proximity module 320 may consult the policy 325 to determine an appropriate modification for each function and range combination. For example, the proximity module 320 may modify a function using a prophetic modification of Table 1.

In one example, the proximity module 320 may modify 510 a wireless data stream function to a reduced service rate if the distance 125 is within the medium range 120b. Similarly, the proximity module 320 may modify 510 a music function to support full music download and broadcast if the distance 125 is within the near range 120c.

By modifying a function of the electronic device 105 based on a range 120 of the distance 125 between the electronic device 105 and the transported device 110, the embodiments may reduce an overall operating cost of the function, bandwidth consumption, and/or an environmental footprint of the function. As a result, the electronic device 105 may be used less expensively and with less impact.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a memory that stores machine readable code;
   a processor executing the machine readable code, the machine readable code comprising:
   a proximity module that determines a distance between an electronic device and a transported device in wireless communication with the electronic device and that modifies a wireless data stream function that communicates data to the electronic device if the distance is within a specified range, wherein the wireless data stream is disabled if the distance exceeds an outer boundary of the range.

2. The apparatus of claim 1, wherein modifying the wireless data stream function performs the modifications selected from the group consisting of decreasing a service rate for the wireless data stream function if the distance is within the range and greater than a near range and increasing the service rate for the wireless data stream function if the distance is within the near range.

3. The apparatus of claim 1, wherein the distance is calculated from observations selected from the group consisting of a time interval from a signal to a return signal, a loss of the wireless communication, a wireless communication signal strength, a wireless communication fingerprint, a radio direction finding, an inertial navigation location for the electronic device and the transported device, and global positioning system locations for the electronic device and the transported device.

4. The apparatus of claim 1, wherein the wireless data stream function is not modified during a critical operation.

5. The apparatus of claim 1, wherein the wireless data stream function is not modified during a download.

6. A method comprising:
   determining, by use of a processor, a distance between an electronic device and a transported device in wireless communication with the electronic device; and
   modifying a wireless data stream function that communicates data to the electronic device if the distance is within a specified range, wherein the wireless data stream is disabled if the distance exceeds an outer boundary of the range.

7. The method of claim 6, wherein modifying the wireless data stream function comprises decreasing a service rate for the wireless data stream function if the distance is within the range and greater than a near range.

8. The method of claim 6, wherein modifying the wireless data stream function comprises increasing a service rate for the wireless data stream function if the distance is within a near range.

9. The method of claim 6, wherein modifying the wireless data stream function performs the modifications selected from the group consisting of enabling the wireless data stream function, disabling the wireless data stream function, unlocking the electronic device, and changing a status.

10. The method of claim 6, wherein the wireless communication is selected from the group consisting of a Bluetooth connection, a WiFi network, a Radio Frequency Identification (RFID) communication, a ZigBee connection, a Z-Wave connection, an ANT+ connection, an infrared connection, and a cellular telephone network communication.

11. The method of claim 6, further comprising a plurality of functions that each has at least one corresponding specified range.

12. The method of claim 6, wherein the distance is calculated from a time interval from a signal to a return signal.

13. The method of claim 6, wherein the distance is calculated from observations selected from the group consisting of a time interval from a signal to a return signal, a loss of the wireless communication, a wireless communication signal strength, a wireless communication fingerprint, a radio direction finding, an inertial navigation location for the electronic device and the transported device, and global positioning system locations for the electronic device and the transported device.

14. The method of claim 6, wherein the wireless data stream function is not modified during a critical operation.

15. The method of claim 6, wherein the wireless data stream function is not modified during a download.

16. A program product comprising a tangible computer readable storage medium storing machine readable code executed by a processor to perform the operations of:

determining a distance between an electronic device and a transported device in wireless communication with the electronic device; and modifying a wireless data stream function that communicates data to the electronic device if the distance is within a specified range, wherein the wireless data stream is disabled if the distance exceeds an outer boundary of the range.

17. The program product of claim 16, wherein modifying the wireless data stream function performs the modifications selected from the group consisting of decreasing a service rate for the wireless data stream function if the distance is within the range and greater than a near range and increasing a service rate for the wireless data stream function if the distance is within the near range.

18. The program product of claim 16, wherein the distance is calculated from observations selected from the group consisting of a time interval from a signal to a return signal, a loss of the wireless communication, a wireless communication signal strength, a wireless communication fingerprint, a radio direction finding, an inertial navigation location for the electronic device and the transported device, and global positioning system locations for the electronic device and the transported device.

19. The program product of claim 16, wherein the wireless data stream function is not modified during a critical operation.

20. The program product of claim 16, wherein the wireless data stream function is not modified during a download.

* * * * *